Nov. 3, 1959
H. J. M. JOORMANN ET AL
2,911,553
ELECTRO-LUMINESCENT ELEMENT
Filed March 14, 1956
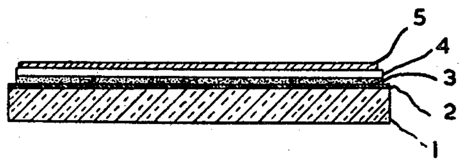
INVENTOR
HENDRIK JACOBUS MARIA JOORMANN
PIETER ZALM
BY [signature]
AGENT United States Patent Office 2,911,553

Patented Nov. 3, 1959

2,911,553

ELECTRO-LUMINESCENT ELEMENT

Hendrik Jacobus Maria Joormann and Pieter Zalm, Eindhoven, Netherlands, assignors, by mesne assignments, to North American Philips Company, Inc., New York, N.Y., a corporation of Delaware Application March 14, 1956, Serial No. 571,453

Claims priority, application Netherlands April 1, 1955

3 Claims. (Cl. 313—108)

This invention relates to electro-luminescent elements made up of a layer of electro-luminescent material which is sandwiched between two conductive layers.

Electro-luminescent elements comprising a layer of electro-luminescent material sandwiched between two conductive layers are known. Thus, for example, an element has been described which comprises a unilaterally conductive glass supporting member with an electro-luminescent layer of zinc sulphide containing some activator provided on its conductive layer and a second conductive layer provided on the electro-luminescent layer at the side remote from the support. When setting up an electrical voltage between the conductive layers, more particularly an alternating voltage, said electro-luminescent layer emits radiation. Radiation from the electro-luminescent layer leaves the element making one or both conductive layers transparent for said radiation. This may, for example, be effected in a simple manner by making the glass support conductive at its surface by subjecting it to the action of tin chloride and phosphorus pentachloride at elevated temperatures. This conductive layer transmits radiation over a considerable frequency range.

It is often sufficient for the electro-luminescent element to radiate from one side. In this case the construction of the element is simpler, since one of the conductive layers need not be made transparent for the radiation. Said conductive layer may then, for example, consist of glued metal foil or metal provided by vaporisation or spraying.

In order to obtain a high efficiency it is vital that the conductive layers should be in intimate contact with the electro-luminescent layer. When gluing the aforesaid conductive foil it is difficult to obtain a satisfactory contact. Yet the use of a foil is advantageous, in that the foil acts not only as an electrode but also as reflector with regard to radiation towards the foil. This yields an increase in useful radiation through the transparent conductive layer.

A more intimate contact between the electro-luminescent layer and the opaque conductive layer is obtained by vaporisation or disintegration of metal. It has been found that in spite of the better contact and a resulting increase in radiation produced the useful radiation does not considerably increase and even diminishes in comparison with a conductive layer provided in the form of a foil. This is probably to be ascribed to the fact that in this case the radiation produced is less well reflected.

The present invention has for its purpose to obtain a high efficiency by using a different reflecting layer.

An electro-luminescent element in accordance with the invention is made up of a layer of electro-luminescent material at most 100 microns thick and sandwiched between two conducting layers, at least one of which is transparent to the radiation from the electro-luminescent layer on setting up a voltage between the two conductive layers, and it having the feature that a layer of titanium dioxide 10 to 50 microns thick is provided between the electro-luminescent layer and the conductive layer provided at the side remote from the transparent conductive layer.

It has been found that the quantity of useful radiation from an element in accordance with the invention greatly exceeds the quantity of useful radiation from an element having a metal layer provided by vaporisation or disintegration. This is remarkable, since the titanium dioxide is a diffuse reflector and as such probably comparable to a metal layer provided by vaporisation or spraying. Letting both layers have substantially the same reflection coefficient with regard to the radiation produced, it might be expected that the element with an intermediate layer of titanium dioxide would emit less useful radiation at the same voltage applied since there is no longer direct contact between the layer of electro-luminescent material and the conductive layer behind the layer of titanium dioxide. The voltage applied between the electrodes then has, in fact, to be distributed over the layer of electro-luminescent material and the layer of titanium dioxide. This distribution is effected in accordance with the quotients of the dielectric constants and the thickness. Since the dielectric constant of titanium dioxide largely exceeds that of the usual electro-luminescent materials a considerable part of the voltage applied is set up across the electro-luminescent layer. However, the voltage set up at the electro-luminescent layer is invariably lower than with a similar element without titanium dioxide layer where the electrode is in contact with the electro-luminescent layer. For this reason less radiation would be produced, since the radiation is proportional to the voltage. As the reflection of titanium dioxide is comparable to that of the metal applied by vaporisation the overall useful radiation were to be lower. This now is not true, since the useful radiation is found to be one and a half to twice as high. This phenomenon could so far not be accounted for.

An important additional advantage attaching to the intermediate layer of titanium dioxide is that the breakdown voltage of the complete element is considerably higher.

The titanium dioxide has a dielectric constant of approximately 90, while most electro-luminescent materials have a dielectric constant of approximately 10. Since, however, both the electro-luminescent material and the titanium dioxide have to be provided together with a binder, the dielectric constants of the layers drop. However, the dielectric constant of the layer of titanium dioxide remains considerably higher than that of the electro-luminescent layer.

The thickness of the electro-luminescent layer should not exceed 100 microns, since otherwise the useful radiation does not increase on account of high self-absorption particularly of the reflected radiation. The minimum thickness of said layer is determined by the grain size of the electro-luminescent material, which is mostly not smaller than approximately 15 microns. The layer of titanium dioxide will preferably be made as thin as possible, the minimum thickness being determined by the desired breakdown voltage and the covering power. The maximum thickness of the layer of titanium dioxide is determined by the permissible voltage loss through said layer.

It has been found that both forms of titanium dioxide, that is to say rutile and anatase, may conveniently be used for electro-luminescent elements in accordance with the invention. Since rutile has better electrical properties this modification will preferably be used.

As electro-luminescent material for use in elements in accordance with the invention any electro-luminescent material, more particularly activated zinc sulphides, may be used.

In order that the invention may be readily carried into effect an example will now be described with reference to the accompanying drawing, which shows in cross-section an electro-luminescent element in accordance with the invention. It comprises a glass support 1 which, on the side indicated by 2, has been made conductive by treating it with tin chloride and phosphorus pentachloride. This layer 2 carries a layer 3 of electroluminescent zinc sulphide activated, for example, by means of copper, silver or gold. On the side remote from the support 1 the layer 3 is covered with the layer of titanium dioxide 4 which carries a conductive layer 5. This layer 5 may be or may not be transparent to the radiation from the electroluminescent layer 3. It may, for example, be provided by vaporisation, spraying or gluing a foil, for example consisting of aluminum.

In a particular construction of the element shown in the drawing, the glass support 1 was 2 mms. thick, the electroluminescent layer was 50 microns thick and the titanium dioxide layer was 10 microns thick. The layers 2 and 5 were extremely thin. The electro-luminescent material was copper-activated zinc sulphide. An alternating voltage of 150 v. and 70 c./sec. set up between the layers 2 and 5 produced a green radiation with an efficiency of 1.91 lumens per watt. With an element made up in exactly the same manner, but from which the layer of titanium oxide 4 was omitted and the layer 5 had been directly applied by vaporisation onto the electro-luminescent layer, the same voltage yielded 0.72 lumen per watt. The breakdown voltage of the element with the layer of titanium dioxide was 720 volts, without the layer of titanium dioxide 500 volts.

What is claimed is:

1. An electroluminescent element comprising a layer of an electroluminescent material having a maximum thickness of about 100 microns, a conductive layer of material transparent to luminescence from said electroluminescent layer in contact with one surface of said electroluminescent layer, a layer of titanium dioxide having a thickness from 10 to 50 microns and reflective to the luminescence from said electroluminescent layer in contact with the other surface of the electroluminescent layer and a conductive layer in contact with the surface of the titanium dioxide layer remote from the electroluminescent layer.

2. An electroluminescent element comprising a layer of an electroluminescent material having a maximum thickness of about 100 microns, a conductive layer of material transparent to luminescence from said electroluminescent layer in contact with one surface of said electroluminescent layer, a glass layer in contact with the surface of said transparent layer remote from the electroluminescent layer, a layer of titanium dioxide having a thickness from 10 to 50 microns and reflective to the luminescence from said electroluminescent layer in contact with the other surface of the electroluminescent layer and a conductive layer in contact with the surface of the titanium dioxide layer remote from the electroluminescent layer having the surface remote from the titanium dioxide layer in contact with a glass layer.

3. The electroluminescent layer of claim 1 in which the titanium dioxide is in the rutile modification.

References Cited in the file of this patent

UNITED STATES PATENTS 2,709,765 Koller ---------------- May 31, 1955